(12) United States Patent
Rabipour et al.

(10) Patent No.: US 9,270,830 B2
(45) Date of Patent: Feb. 23, 2016

(54) ECHO CANCELLER FOR VOIP NETWORKS

(71) Applicant: TELEFONAKTIEBOLAGET L M ERICSSON (PUBL), Stockholm (SE)

(72) Inventors: Rafi Rabipour, Quebec (CA); Dominic Ho, Columbia, MO (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 78 days.

(21) Appl. No.: 13/960,008

(22) Filed: Aug. 6, 2013

(65) Prior Publication Data

US 2015/0043361 A1 Feb. 12, 2015

(51) Int. Cl.
*H04M 9/08* (2006.01)
*H04L 12/26* (2006.01)
*H04B 3/23* (2006.01)

(52) U.S. Cl.
CPC ............... *H04M 9/082* (2013.01); *H04B 3/23* (2013.01); *H04L 43/0841* (2013.01)

(58) Field of Classification Search
None
See application file for complete search history.

(56) References Cited

U.S. PATENT DOCUMENTS

| | | | |
|---|---|---|---|
| 6,324,170 B1 | 11/2001 | McClennon et al. | |
| 6,757,384 B1 | 6/2004 | Ketchum | |
| 6,816,592 B1 * | 11/2004 | Kirla | H04B 3/23 370/289 |
| 7,039,182 B1 * | 5/2006 | Leonidov | H04M 9/082 379/406.03 |
| 7,304,962 B1 | 12/2007 | Kirla et al. | |
| 7,333,447 B2 | 2/2008 | LeBlanc | |
| 8,238,548 B2 | 8/2012 | Frauenthal et al. | |
| 2001/0028634 A1 * | 10/2001 | Huang | G10L 19/005 370/252 |
| 2003/0035384 A1 * | 2/2003 | Cline | H04B 3/23 370/286 |
| 2003/0053618 A1 * | 3/2003 | Marchok | G10L 15/30 379/406.01 |
| 2003/0091182 A1 | 5/2003 | Marchok et al. | |
| 2003/0219113 A1 | 11/2003 | Bershad et al. | |
| 2003/0223574 A1 * | 12/2003 | Schulz | H04M 9/082 79/406.01 |
| 2004/0081315 A1 * | 4/2004 | Boland | H04B 3/23 379/406.01 |
| 2004/0120510 A1 * | 6/2004 | LeBlanc | H04B 3/23 379/406.01 |
| 2004/0184443 A1 * | 9/2004 | Lee | G10L 19/005 370/352 |
| 2006/0098807 A1 | 5/2006 | Page et al. | |
| 2006/0140392 A1 | 6/2006 | Ahmadi | |
| 2008/0075269 A1 | 3/2008 | Raifel | |
| 2008/0205633 A1 | 8/2008 | Dyba | |
| 2008/0212567 A1 * | 9/2008 | El-Hennawey | G10L 25/69 370/352 |
| 2008/0317241 A1 * | 12/2008 | Wang | H04M 9/082 379/406.11 |
| 2009/0168673 A1 | 7/2009 | Kalampoukas | |
| 2009/0202063 A1 * | 8/2009 | Frauenthal | H04M 9/08 379/406.16 |
| 2010/0191525 A1 * | 7/2010 | Rabenko | H04B 3/23 704/211 |
| 2011/0205915 A1 * | 8/2011 | Skrabutenas | H04M 3/002 370/252 |
| 2014/0112467 A1 | 4/2014 | Wyss et al. | |
| 2014/0358526 A1 * | 12/2014 | Abdelal | G10L 25/69 704/202 |

* cited by examiner

*Primary Examiner* — Chi H Pham
*Assistant Examiner* — Vladislav Agureyev
(74) *Attorney, Agent, or Firm* — Coats & Bennett, PLLC

(57) ABSTRACT

An echo canceller in an IP network includes an adaptive filter that models the echo path between a receiving output port of the echo canceller and a sending input port. The adaptive filter filters a receiving input signal to generate an estimate of an echo signal. The estimate of the echo signal is subtracted from a sending input signal to cancel the echo in the sending input signal and to generate a sending output signal. A packet loss detection circuit detects when packet loss occurs in the echo path. Responsive to detection of packet loss in the echo path, the echo canceller applies packet loss concealment to either the sending output signal or the receiving input signal.

25 Claims, 11 Drawing Sheets

ECHO CANCELLER FOR VOIP NETWORKS

TECHNICAL FIELD

The present disclosure relates generally to echo cancellation for voice communications and, more particularly, to an echo canceller for deployment in an IP network subject to packet loss, jitter, and other impairments that cause nonlinearities in the echo path.

BACKGROUND

Traditional telephony was based on circuit-switched (CS) networks, which still remain the predominant means for carrying voice communication. Landline circuit-switched connections typically give rise to echo due to the imperfect balance of hybrid circuits at the junction of the 4-wire network and the 2-wire local loop. Echo is recognized as a severe voice quality impairment, and echo cancellers are typically deployed within circuit-switched networks to resolve this problem.

With the emergence and the accelerated adoption of Internet Protocol (IP) networks, it is increasingly common for voice communication paths to span a mix of IP and circuit-switched networks. Such a voice path, when terminating on a landline endpoint, will suffer degradation due to echo, requiring echo cancellation. The conventional (and typically the best) location for the echo canceller is in the circuit-switched network, near the source of the echo. However, under certain circumstances it may not be feasible to rely on deployment of echo cancellers in the circuit-switched network. For example, the network operator in charge of the IP network (or of a wireless network) may not have control over the type (and effectiveness) of echo cancellers deployed in the CS network, making it desirable or necessary to treat the echo by deploying an echo canceller in the IP network.

IP networks are subject to impairments such as packet loss and delay variation (jitter). To an echo canceller deployed in the IP network, the portion of the network between the echo canceller and the echo source is a part of the echo-path. Packet loss, jitter, as well as their remedies, i.e., packet-loss concealment (PLC) and jitter buffer delay variation (JBDV), cause nonlinear behavior of the echo-path that are extremely harmful to the operation of conventional echo cancellers designed to adapt to echo-paths with linear impulse responses.

Furthermore, PLC and JBDV can occur both in the send direction (IP-to-CS path) and the receive direction (CS-to-IP path). When PLC and/or JBDV occur in the send direction, the node including the echo canceller will not have explicit knowledge of the packet loss or JBDV experienced in that path.

SUMMARY

The present disclosure relates to echo cancellation in IP networks for Voice over IP (VoIP) communication. The echo canceller includes an adaptive filter that models the echo path between a receiving output port of the echo canceller and a sending input port. The adaptive filter filters a receiving input signal to generate an estimate of an echo signal. The estimate of the echo signal is subtracted from a sending input signal to cancel the echo in the sending input signal and to generate a sending output signal. A packet loss detection circuit detects when packet loss occurs in the echo path. Responsive to detection of packet loss in the echo path, the echo canceller applies packet loss concealment to either the sending output signal or the receiving input signal. In the first case, the loss-concealment packet replaces the packet of the sending output signal affected by packet loss. In the second case, the loss-concealment packet modifies a corresponding packet of the receiving input signal so that the echo estimate from the adaptive filter cancels the echo signal more effectively. In some embodiments, an image filter is provided to store a previous version of the converged echo path model, which can be used to generate an auxiliary estimate of the echo. When the adaptive filter diverges due to packet loss, the auxiliary estimate of the echo from the image filter may be used to generate the output of the echo canceller until the adaptive filter re-converges to the correct echo path model.

Exemplary embodiments of the present disclosure comprise methods implemented by an echo canceller in an IP network. In one exemplary method, the echo canceller generates, from a receiving input signal received on a first input port of the echo canceller, a first estimate of an echo signal using an adaptive filter that models an echo path between a first output port and a second input port of the echo canceller. The echo canceller generates a sending output signal based on the first estimate of the echo signal and a sending input signal received on the second input port. The echo canceller detects a packet loss in the echo path. Responsive to detection of the packet loss, the echo canceller modifies one of the receiving input signal and the sending output signal to include a loss-concealment packet.

Other embodiments of the present disclosure comprise an echo canceller in an IP network for VoIP communications. The echo canceller comprises a filter circuit, an echo cancellation circuit, a detection circuit and a packet loss concealment circuit. The filter circuit is configured to generate, from a receiving input signal received on a first input port of the echo canceller, a first estimate of an echo signal using an adaptive filter that models an echo path between a first output port and a second input port of the echo canceller. The echo cancellation circuit is configured to generate a sending output signal based on the first estimate of the echo signal and a sending input signal received on the second input port. The detection circuit is configured to detect a packet loss in the echo path. Responsive to detection of the packet loss by the detection circuit, the packet loss concealment circuit modifies one of the first input signal and the sending output signal to include a loss-concealment packet. In one exemplary embodiment, the receiving input signal is modified when the packet loss is determined to be in the send direction, i.e, IP-to-CS path.

The methods and apparatus as herein described reduce the impact of packet loss on the overall performance of the echo canceller. The solutions have low complexity and can be incorporated into existing echo cancellers. The techniques are particularly useful for handling packet loss in the IP-to-CS path, which is "invisible" to the echo canceller.

DETAILED DESCRIPTION

Figure 1A:
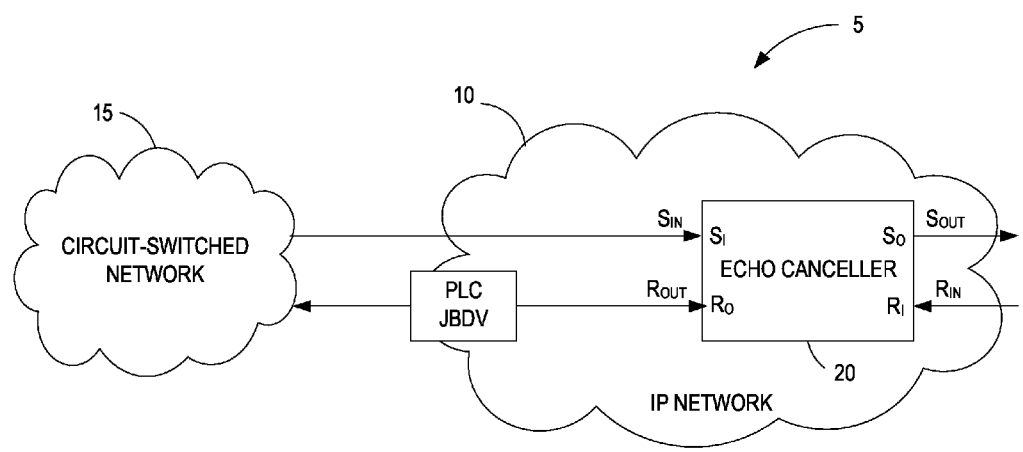
FIGS. 1A and 1B illustrate a network including an echo canceller according to embodiments of this disclosure.
Figure 1B:
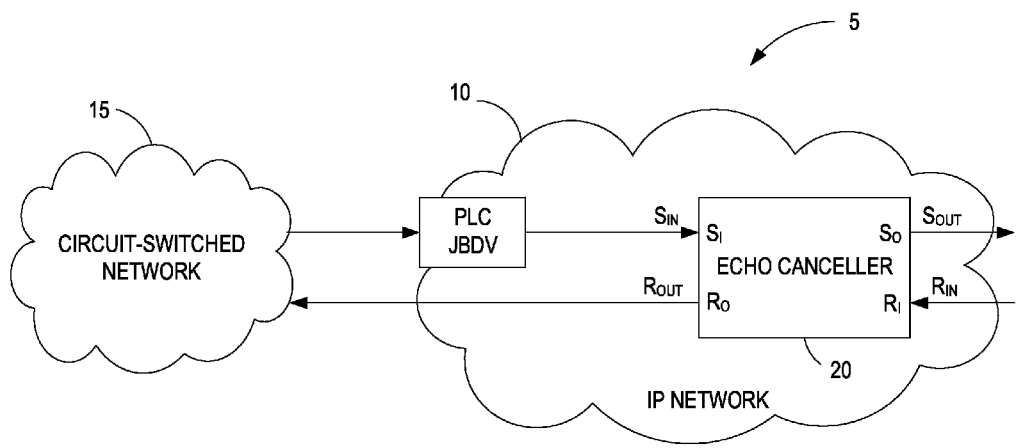

Referring now to the drawings, FIGS. 1A and 1B illustrate an exemplary communication network 10 using an echo canceller 20 as herein described. Various representative embodiments of the echo canceller 20 are described to illustrate the function and operation of the echo canceller 20. For convenience, similar reference numerals are used throughout the Figures to indicate similar elements.

The communication network 5 comprises a mixed network including an Internet Protocol (IP) network 10 or other packet-switched (PS) network, and a circuit-switched (CS) network 15. The echo canceller 20 is located in the IP network 10 along a voice path between a far end user and a near end user. The echo canceller 20 comprises a first input port ($R_I$), a first output port ($R_O$), a second input port ($S_I$), and a second output port ($S_O$). The echo canceller 20 receives a receiving input ($R_{IN}$) signal from the far end user via the $R_I$ port and transmits a receiving output ($R_{OUT}$) signal to the near end user via the $R_o$ port. The echo canceller 20 also receives a sending input ($S_{IN}$) signal from the near end user via the $S_I$ port and transmits a sending output ($S_{OUT}$) signal to the far end user via the $S_O$ port. The $R_{IN}$ signal and $S_{IN}$ signal may for example comprise voice signals or other audio signals. The job of the echo canceller 20 is to cancel any echo of the $R_{OUT}$ signal that may be present in the $S_{IN}$ signal. To perform this task, the echo canceller 20 uses an adaptive filter to model the echo path and to estimate the echo signal based on the echo path model. The estimated echo signal is subtracted from the $S_{IN}$ signal to generate the $S_{OUT}$ signal.

The deployment of the echo canceller 20 in the IP network 10 creates a problem for the echo canceller 20. Signals transmitted and received over the IP network 10 are subject to impairments such as packet-loss and delay variation (jitter). Packet loss, delay variation, as well as their remedies, i.e. packet-loss concealment (PLC) and jitter buffer delay variation (JBDV) introduce non-linearities into an echo path. Packet loss and jitter can occur in both the IP-to-CS path (FIG. 1A) and in the CS-to-IP path (FIG. 1B). Thus, PLC and JBDV may be implemented in both paths. Because conventional echo cancellers are designed based on the assumption that the echo path is linear, these non-linearities may prevent a conventional echo canceller from removing the echo and may cause the model of the echo path used by the canceller to diverge from the correct echo path model.

Exemplary embodiments of the present disclosure provide techniques to mitigate the problem of packet loss and packet loss concealment on the performance of the echo canceller 20. These techniques are particularly useful when the packet loss or jitter occurs in the IP-to-CS path, which is "invisible" to the echo canceller 20. Typically, when a packet is lost, PLC is used to generate a loss-concealment packet to replace the lost packet. The loss-concealment packet is generated using information in the previously received packets. In the prior art, PLC processing may be applied to the $R_{OUT}$ signal or to the $S_{IN}$ signal. Voice samples in the loss-concealment packet are unlikely to be the same as the as the actual voice samples in the lost packet. Although packet loss mostly occurs in isolated packets, it will cause a noticeable artifact in the $S_{OUT}$ signal.

Also, the packet loss may cause the adaptive filter in the echo canceller 20 to diverge from the converged echo path model because the $R_{IN}$ signal, which is used as a reference signal, does not undergo PLC processing. Once the adaptive filter diverges, the echo cannot be cancelled completely and a residual echo will remain after cancellation until the adaptive filter re-converges back to the echo path model. The residual echo may last for about 100 ms after a packet loss occurs.

Figure 2:
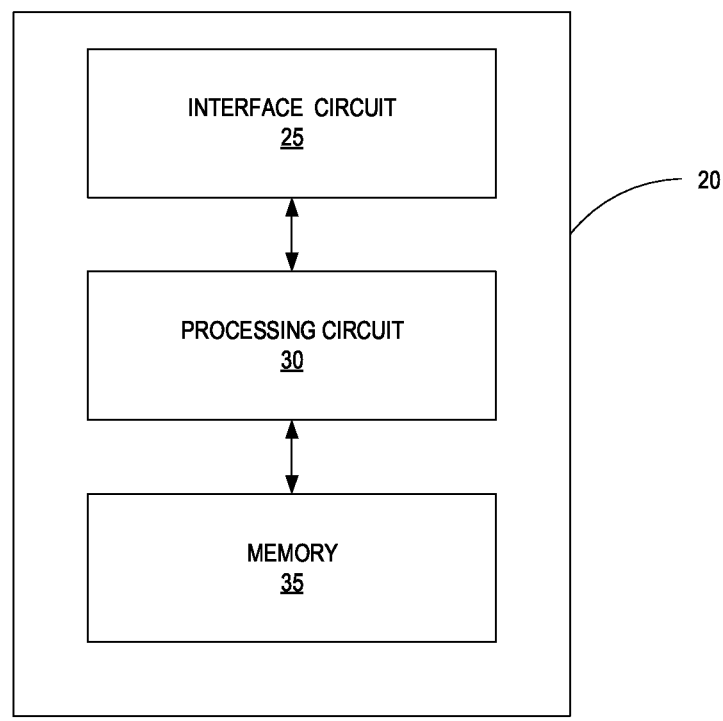
FIG. 2 illustrates the main functional elements of the echo canceller according to embodiments of the present disclosure.

FIG. 2 illustrates an echo canceller 20 according to one embodiment of the present disclosure. The echo canceller 20 comprises an interface circuit 25, processing circuit 30, and memory 35. The interface circuit 30 enables the echo canceller 20 to transmit and receive voice signals over the IP network 10. The processing circuit 30 processes the signals being transmitted and received to perform echo cancellation. The processing circuit 30 may comprise one or more microprocessors, hardware, firmware, or a combination thereof. As will be hereinafter described in more detail, the processing circuit 30 is configured to detect the occurrence of packet loss in the echo path and to mitigate the effects of the packet loss on the output of the echo canceller 20. The memory 35 stores program instructions and data used by the processing circuit 30 to perform its functions. The memory 35 may comprise both volatile memory, such as random access memory (RAM), and non-volatile memory such a read-only memory (ROM) and Flash memory. Memory 35 may be implemented as stacked memory, or as discrete memory devices.

Figure 3:
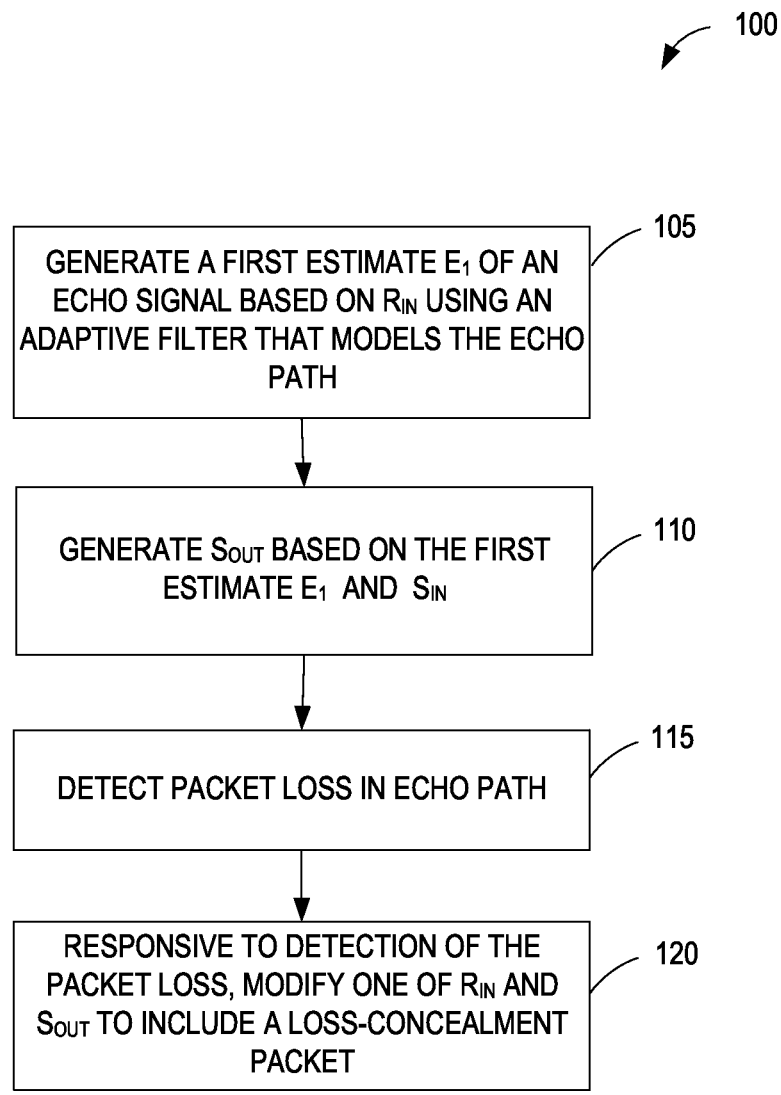
FIG. 3 illustrates a method implemented by the echo canceller

FIG. 3 illustrates an exemplary method 100 implemented by the echo canceller 20. The echo canceller 20 generates, from a $R_{IN}$ signal, a first estimate $E_1$ of an echo signal (block 105). The first estimate $E_1$ of the echo signal is generated using an adaptive filter that models an echo path between the first output port ($R_O$) and the second input port ($S_1$) of the echo canceller 20. The echo canceller 20 generates a $S_{OUT}$ signal based on the first estimate $E_1$ of the echo signal and $S_{IN}$ (block 110). The echo canceller 20 detects a packet loss in the echo path (block 115). Responsive to detection of the packet loss, the echo canceller 20 modifies one of the $R_{IN}$ and $S_{OUT}$ signals to include a loss-concealment packet (block 120). In one exemplary embodiment, the echo canceller 20 is configured to modify the $R_{IN}$ signal only when the packet loss is determined to occur in the IP-to-CS path.

Figure 4:
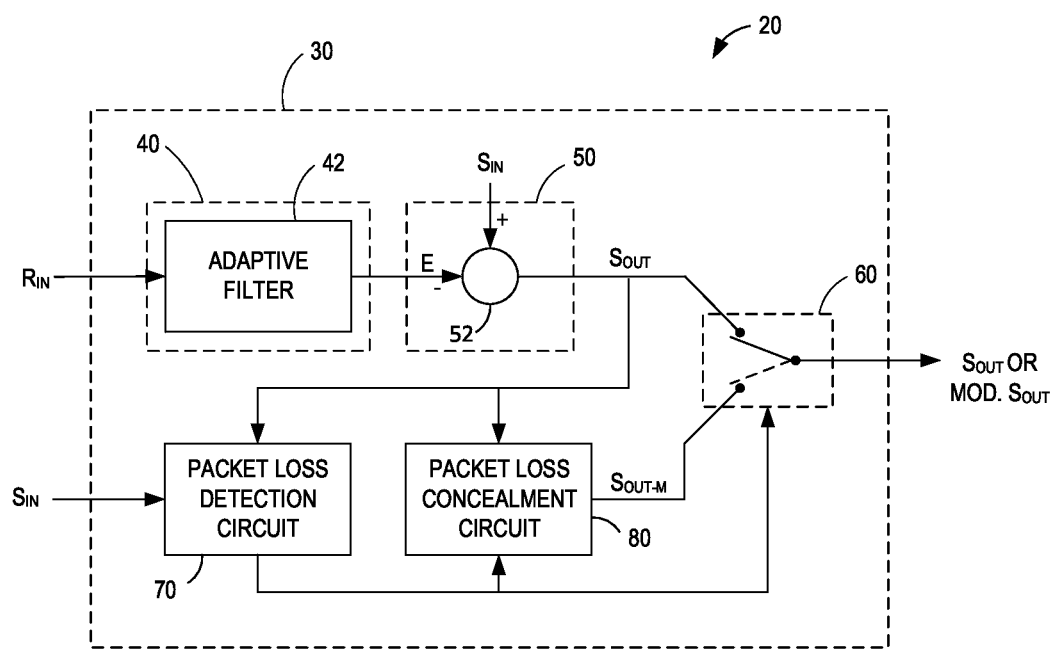
FIG. 4 illustrates the processing circuit of the echo canceller according to a first embodiment.

FIG. 4 illustrates the main functional elements of the processing circuit 30 in a first embodiment of the echo canceller 20. In this embodiment, the echo canceller 20 applies packet loss concealment to the $S_{OUT}$ signal when packet loss is detected.

The processing circuit 30 shown in FIG. 4 comprises a filter circuit 40, an echo cancellation circuit 50, or selection circuit 60, a packet loss detection circuit 70, and a packet loss concealment circuit 80. The $R_{IN}$ signal is input to the filter circuit 40. The filter circuit 40 comprises an adaptive filter 42 that models the echo path between the Ro port and the $S_I$ port of the echo canceller 20. The adaptive filter may, for example, comprise a Least-Mean-Square (LMS) filter. The adaptive filter 42 filters the $R_{IN}$ signal using filter coefficients derived based on the echo path model to generate a first estimate $E_1$ of the echo signal. The adaptive filter also uses the $R_{IN}$ signal as a reference to adapt the echo path model.

The echo cancellation circuit 50 comprises an adding circuit 52 that subtracts the first estimate $E_1$ of the echo signal from the $S_{IN}$ signal to generate the $S_{OUT}$ signal. The $S_{OUT}$ signal is applied to a first input of the selection circuit 60. The packet loss detection circuit 70 detects packet loss in the echo path. When packet loss is detected, the packet loss detection circuit 80 enables the packet loss concealment circuit 70, which is normally disabled. The packet loss concealment circuit 80 modifies the $S_{OUT}$ signal to include a loss-concealment packet (LCP) and outputs the modified $S_{OUT}$ signal, denoted $S_{OUT-M}$, to the selection circuit 60. The selection circuit 60, under the control of the packet loss detection circuit 70, selects either the $S_{OUT}$ signal or the $S_{OUT-M}$ signal for output depending on whether packet loss is detected. When no packet loss is detected, the selection circuit 60 is controlled to output the $S_{OUT}$ signal. When a packet loss is detected, the selection circuit 60 is controlled to output the modified $S_{OUT}$ signal, $S_{OUT-M}$.

Figure 5:
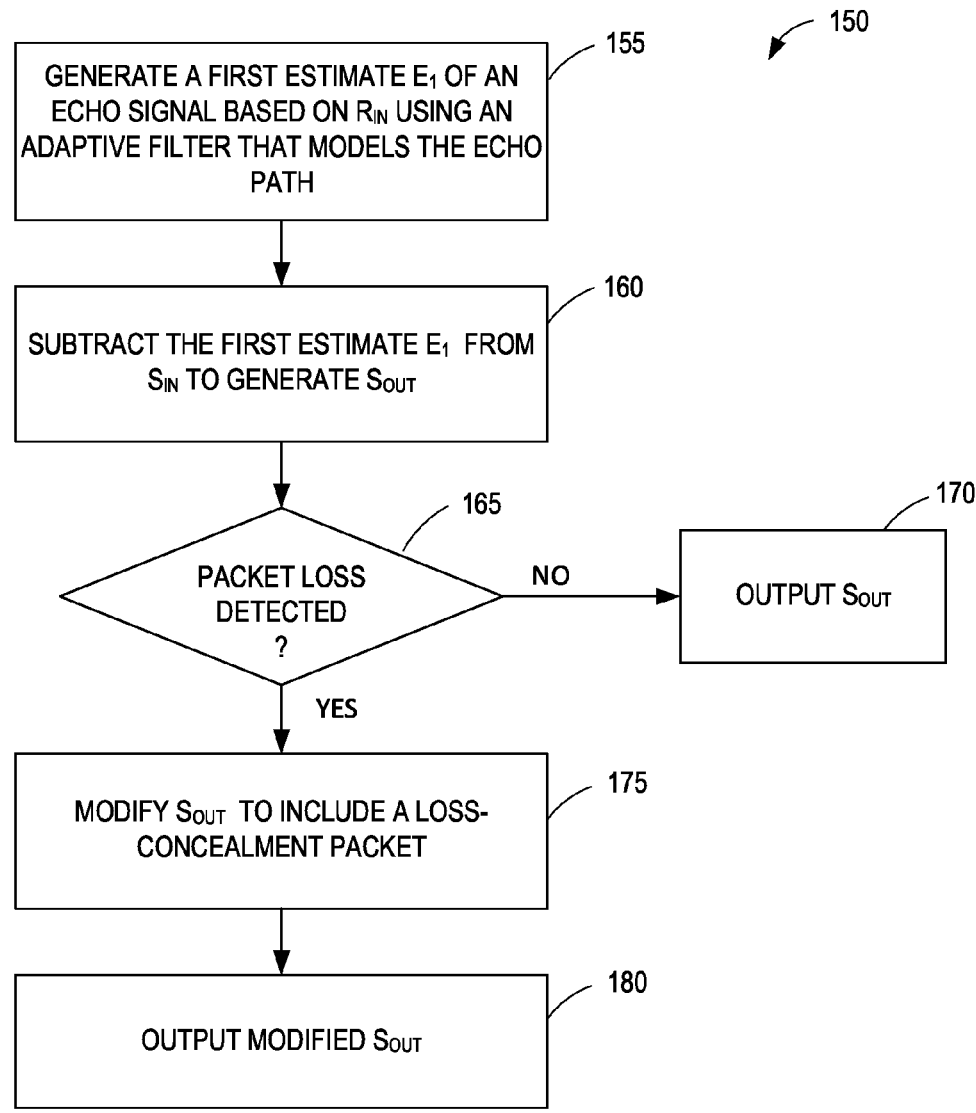
FIG. 5 illustrates a method implemented by the echo canceller depicted in FIG. 4.

FIG. 5 illustrates an exemplary method 150 implemented by the echo canceller 20 shown in FIG. 4. The adaptive filter 42 of the echo canceller 20 generates a first estimate $E_1$ of an echo signal based on $R_{IN}$ (block 155). The first estimate $E_1$ of the echo signal is generated using a model of the echo path between the $R_O$ port and the $S_I$ port of the echo canceller 20. The echo cancellation circuit 50 of the echo canceller 20 subtracts the first estimate $E_1$ of the echo signal from the $S_{IN}$ signal to generate the $S_{OUT}$ signal (block 160). The packet loss detection circuit 70 detects a packet loss in the echo path (block 165). If no packet loss is detected, the selection circuit 60 outputs the $S_{OUT}$ signal from the echo cancellation circuit 50 (block 170). If packet loss is detected, the packet loss concealment circuit 80 of the echo canceller 20 modifies the $S_{OUT}$ signal to include a loss-concealment packet (block 175) and the selection circuit 60 outputs the modified $S_{OUT}$ signal, $S_{OUT-M}$ (block 180). The loss-concealment packet replaces the packet in the $S_{OUT}$ signal affected by the packet loss.

Figure 6:
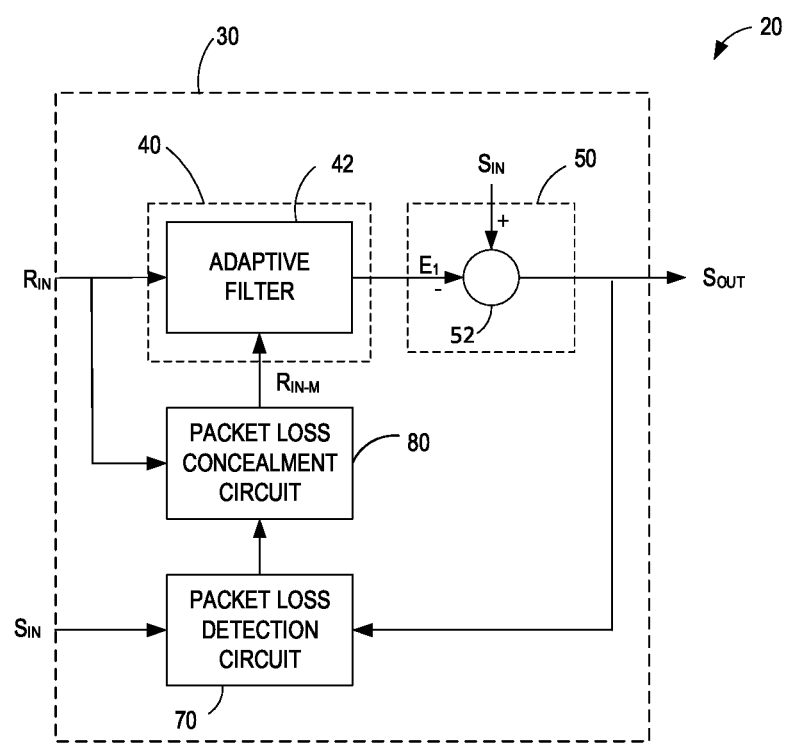
FIG. 6 illustrates the processing circuit of the echo canceller according to a second embodiment.

FIG. 6 illustrates the main functional elements of the processing circuit 30 in a second embodiment of the echo canceller 20. In this embodiment, it is assumed that packet loss has occurred in the IP-to-CS path. The echo canceller 20 attempts to apply the same packet loss concealment to the $R_{IN}$ signal when packet loss in the IP-to-CS path is detected. The modified $R_{IN}$ signal, denoted $R_{IN-M}$, is then used to generate the $S_{OUT}$ signal to mitigate the effects of the packet loss in the IP-to-CS path and to adapt the coefficients of the adaptive filter 42 so that it reconverges more quickly to the correct echo path model should divergence occur.

The processing circuit 30 as shown in FIG. 6 comprises a filter circuit 40, an echo cancellation circuit 50, a packet loss detection circuit 70, and a packet loss concealment circuit 80. The $R_{IN}$ signal is input to the filter circuit 40. The filter circuit 40 comprises an adaptive filter 42 that models the echo path between the $R_O$ port and the $S_I$ port of the echo canceller 20. The adaptive filter 42 filters the $R_{IN}$ signal using filter coefficients derived based on the echo path model to generate a first estimate $E_1$ of the echo signal. The echo cancellation circuit 50 comprises an adding circuit 52 that subtracts the first estimate $E_1$ of the echo signal from the $S_{IN}$ signal to generate the $S_{OUT}$ signal. The packet loss detection circuit 70 detects packet loss in the IP-to-CS path. When a lost packet is detected in the IP-to-CS path, the packet loss detection circuit 80 enables the packet loss concealment circuit 80, which is normally disabled. The $R_{IN}$ signal is input to the packet loss concealment circuit 80. The packet loss concealment circuit 80 includes a buffer to store a predetermined number of packets of the $R_{IN}$ signal. When a packet loss is detected, the estimated echo delay is used to determine the location of a target packet in the $R_{IN}$ signal corresponding to the packet of the $S_{IN}$ signal affected by the packet loss. The packet loss concealment circuit 80 then replaces the target packet of the $R_{IN}$ signal with a loss-concealment packet to generate a modified $R_{IN}$ signal, $R_{IN-M}$. The loss-concealment packet is generated based on previously output packets in the $R_{IN}$ signal. The filter circuit 40 then restores the filter coefficients of the adaptive filter 42 to the state prior to the arrival of the last packet and the adaptive filter 42 regenerates the first estimate $E_1$ of the echo signal based on the modified $R_{IN}$ signal, $R_{IN-M}$. The regenerated first estimate E1 of the echo is then subtracted from the $S_{IN}$ signal by the echo cancellation signal 50 to obtain a new $S_{OUT}$ signal, which is output in place of the original $S_{OUT}$ signal.

Figure 7:
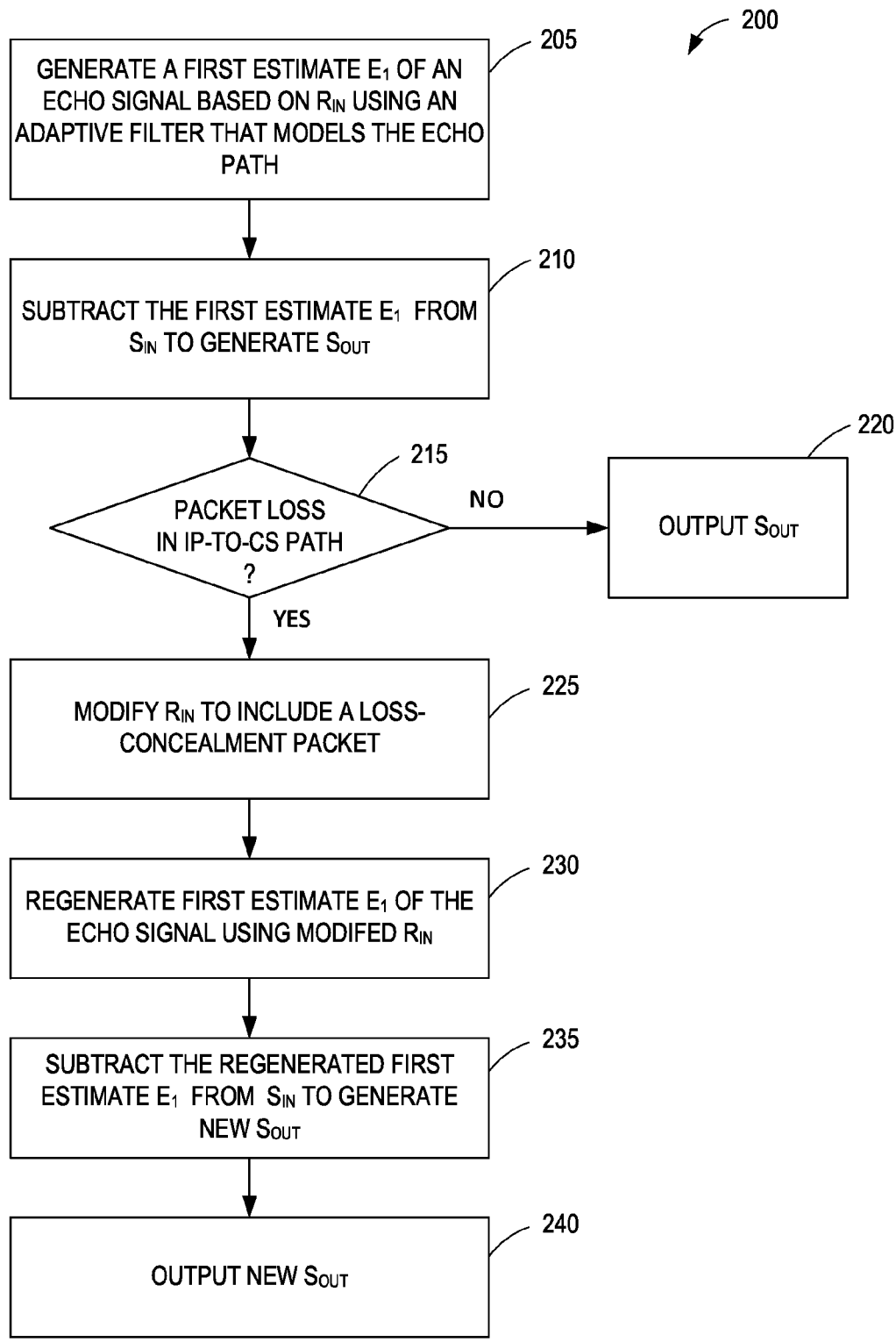
FIG. 7 illustrates a method implemented by the echo canceller depicted in FIG. 6.

FIG. 7 illustrates an exemplary method 200 implement by the echo canceller 20 shown in FIG. 6. The adaptive filter 42 of the echo canceller 20 generates a first estimate $E_1$ of an echo signal based on the $R_{IN}$ signal (block 205). The first estimate $E_1$ of the echo signal is generated using a model of the echo path between the Ro port and the $S_I$ port of the echo canceller 20. The echo cancellation circuit 50 subtracts the first estimate $E_1$ of the echo signal from the $S_{IN}$ signal to generate the $S_{OUT}$ signal (block 210). The packet loss detection circuit 70 detects a packet loss in the echo path (block 215). If no packet loss is detected, the selection circuit 60 outputs the $S_{OUT}$ signal (block 220). If packet loss is detected by the packet loss detection circuit 70 and the packet loss is in the IP-to-CS path, the packet loss concealment circuit 80 of the echo canceller 20 modifies the $R_{IN}$ signal to include a loss-concealment packet (block 225). The modified $R_{IN}$ signal, $R_{IN-M}$) is input to the filter circuit 40. The adaptive filter 42 filters the modified $R_{IN}$ signal to regenerate the first estimate $E_1$ of the echo signal (block 230). The echo cancellation circuit 50 subtracts the regenerated estimate $E_1$ of the echo signal from the $S_{IN}$ signal to generate a new $S_{OUT}$ signal (block 235) and the selection circuit 60 outputs the new $S_{OUT}$ signal (block 240).

The packet loss detection circuit 70 may detect packet loss based on a comparison of the $S_{OUT}$ signal and the $S_{IN}$ signal. In one embodiment, the packet loss detection circuit 70 computes the energy $E_{SOUT}$ of the $S_{OUT}$ signal and the energy $E_{SIN}$ of the $S_{IN}$ signal. Over one packet, packet loss is detected if:

$$E_{SOUT} > E_{SIN} \times 0.1$$

This condition, based on a comparison of the energy $E_{SOUT}$ of the $S_{OUT}$ signal and the energy $E_{SIN}$ of the $S_{IN}$ signal, uses the fact that the Echo Return Loss Enhancement (ERLE) will typically be less than 10 dB when a packet loss has occurred. In another embodiment, an ERLE ratio ($E_{SOUT}/E_{SIN}$) is computed and compared to a predetermined threshold (e.g. 0.09). A packet loss is detected if the ERLE ratio is greater than the threshold.

If packet loss is detected, the sequence numbers of the $S_{IN}$ packets can be used to determine whether the packet loss occurred in the IP-to-CS path or the CS-to-IP path. When the packet loss occurs in the CS-to-IP path, the sequence number of the lost packet will be missed. Thus, packet loss in the IP-to-CS path can be determined by checking whether a sequence number is missed. If a sequence number is missed, then the packet loss likely occurred in the CS-to-IP path. If no sequence number is missed, then the packet loss likely occurred in the IP-to-CS path.

When packet loss is detected, the echo canceller 20 may invoke packet loss concealment on either the $S_{OUT}$ signal or the $R_{IN}$ signal as previously described. As noted previously, packet loss concealment should be applied to the $R_{IN}$ signal only when the packet loss occurs in the IP-to-CS path. Also, the adaptation of the adaptive filter 42 may be stopped to prevent divergence of the adaptive filter 42. Packet loss concealment on the $S_{OUT}$ signal may be applied in either case. Also, it will be recognized that packet loss-concealment could be applied to both the $R_{IN}$ signal and $S_{OUT}$ signal when the packet loss concealment occurs in the IP-to-CS path.

In the case where the packet loss occurs in the IP-to-CS path, there will be a mismatch between the $R_{IN}$ signal, which is used as a reference for adaptation of the adaptive filter 42, and the $S_{IN}$ signal. This mismatch will cause the adaptive filter 42 to diverge from the correct echo path model. Applying packet loss concealment to the $R_{IN}$ signal or $S_{OUT}$ signal reduces the echo in the $S_{OUT}$ packet affected by the packet loss. However, the subsequent packets may still contain a residual echo caused by divergence of the adaptive filter 42. The residual echo may last for several packets following the lost packet.

The embodiments shown in FIGS. 8-11 use an image filter 44 in combination with packet loss concealment to reduce the residual echo in the packets following the lost packet. The image filter 44 stores a stable and converged copy of the adaptive filter 42. Because the echo path does not change before and after the packet loss, the image filter 44 may be used to generate a second estimate $E_2$ of the echo signal when the adaptive filter 42 has diverged. The second estimate $E_2$ of the echo signal may, in turn, be used to generate the $S_{OUT}$ signal until the adaptive filter 42 reconverges to the correct echo path model. Because the image filter 44 is not affected by the packet loss, the overall performance of the echo canceller 20 is improved.

Figure 8:
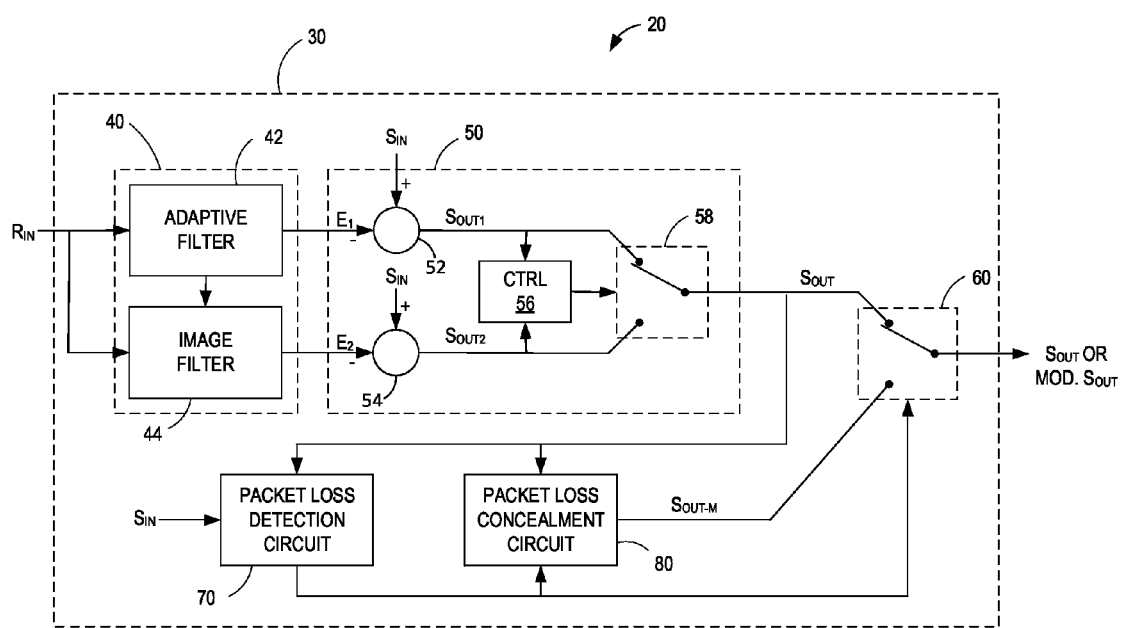
FIG. 8 illustrates the processing circuit of the echo canceller according to a third embodiment.

FIG. 8 illustrates the main functional elements of the processing circuit 30 in a third embodiment of the echo canceller 20. This embodiment of the echo canceller 20 combines packet loss concealment on the $S_{OUT}$ signal to conceal the lost packet and an image filter 44 to reduce residual echo in the packets of the $S_{OUT}$ signal following the lost packet.

The processing circuit 30 shown in FIG. 8 comprises a filter circuit 40, an echo cancellation circuit 50, a selection circuit 60, a packet loss detection circuit 70, and a packet loss concealment circuit 80. The $R_{IN}$ signal is input to the filter circuit 40. The filter circuit 40 comprises an adaptive filter 42 and an image filter 44. The adaptive filter 42 models the echo path between the $R_O$ port and the $S_I$ port of the echo canceller 20. The adaptive filter 42 filters the $R_{IN}$ signal using filter coefficients derived based on the echo path model to generate a first estimate $E_1$ of the echo signal. The image filter 44 stores a stable copy of the converged echo path model used by the adaptive filter 42 so that the image filter 44 may be used when the adaptive filter 42 diverges from the correct echo-path model. The image filter 44 filters the $R_{IN}$ signal using the stored copy of the adaptive filter 42 to generate a second estimate $E_2$ of the echo signal.

When the adaptive filter 42 is stable and converged, the estimates $E_1$ and $E_2$ of the echo signal output by the adaptive filter circuit 42 and image filter 44 respectively should contain only small differences. The image filter 44 is updated only when the echo model used by the adaptive filter 42 has converged to a stable state.

The estimates $E_1$ and $E_2$ output by the adaptive filter 42 and image filter 44 respectively are applied to the echo cancellation circuit 50. The echo cancellation circuit 50 comprises first and second adding circuits 52 and 54, control logic 56, and a switching circuit 58. The first adding circuit 52 subtracts the first estimate $E_1$ of the echo signal from the $S_{IN}$ signal to generate a first sending output signal, $S_{OUT1}$. The second adding circuit 54 subtracts the second estimate $E_2$ of the echo signal from the $S_{IN}$ signal to generate a second sending output signal, $S_{OUT2}$. The control logic 56 compares the $S_{OUT1}$ and $S_{OUT2}$ signals and selects one based on a predetermined criterion. Switching circuit 58, under the control of the control logic 56, outputs the selected one of the $S_{OUT1}$ and $S_{OUT2}$ signals as the final sending output signal, $S_{OUT}$. The $S_{OUT}$ signal is applied to a first input of the selection circuit 60.

In one exemplary embodiment, the control logic 56 compares the $S_{OUT1}$ and $S_{OUT2}$ signals and selects one as the final $S_{OUT}$ signal based on the comparison. As long as the adaptive filter 42 remains in a stable state, the differences between the first and second estimates $E_1$ and $E_2$ of the echo signal will be small. Therefore, the differences between the $S_{OUT1}$ and $S_{OUT2}$ signals will likewise be small. However, when packet-loss or delay variation causes the echo model used by the adaptive filter 42 to diverge, the first estimate $E_1$ output by the adaptive filter 42 will contain a residual echo and the difference between the first and second estimates $E_1$ and $E_2$ of the echo signal will increase due to the residual echo. Divergence of the echo signal can be detected by comparing parameters of the first and second sending output signals that are affected by the residual echo.

In one exemplary embodiment, the control logic 56 is configured to compute the energies of the $S_{OUT1}$ and $S_{OUT2}$ signals and to compare the energies of the $S_{OUT1}$ and $S_{OUT2}$ signals over a predetermined number of packets. The energy of the $S_{OUT1}$ and $S_{OUT2}$ signals over a single packet are given by:

$$E_{SOUT1}(\tau) = \sum_{k=n-N+1}^{n} S_{OUT1}(k)^2$$

$$E_{SOUT2}(\tau) = \sum_{k=n-N+1}^{n} S_{OUT2}(k)^2;$$

where $\tau$ is the packet number, N is the number of samples in a packet, and n is the current time index so that $n=\tau N$. The presence of a residual echo in the $S_{OUT1}$ signal when the adaptive filter 42 diverges will be reflected by increased energy in the $S_{OUT1}$ signal. Thus, by comparing the energy levels of the $S_{OUT1}$ and $S_{OUT2}$ signals over a predetermined number of packets, it can be determined when the adaptive filter 42 is starting to diverge. In one embodiment, divergence is detected when the energy $E_{SOUT1}$ of the $S_{OUT1}$ signal exceeds the energy $E_{SOUT2}$ of the $S_{OUT2}$ signal. The control logic 56 may compare the energy $E_{SOUT1}$ of the $S_{OUT1}$ signal to the energy $E_{SOUT2}$ of the $S_{OUT2}$ signal in the current packet, or may average the energies over a predetermined number of packets (e.g., 2 to 5 packets). When the energy $E_{SOUT1}$ of the $S_{OUT1}$ signal is below the energy $E_{SOUT2}$ of the $S_{OUT2}$ signal, the control logic 56 controls the switching circuit 58 to output the $S_{OUT1}$ signal. When the energy $E_{SOUT1}$ of the $S_{OUT1}$ signal exceeds the energy $E_{SOUT2}$ of the $S_{OUT2}$ signal, the control logic 56 controls the switching circuit 58 to output the $S_{OUT2}$ signal. In other embodiments, the control logic 56 may compute the difference between the $E_{SOUT1}$ of the $S_{OUT1}$ signal and the energy $E_{SOUT2}$ of the $S_{OUT2}$ signal and compare the difference to a threshold.

In another embodiment of the present disclosure, the control logic 56 may compute a correlation of the $S_{OUT1}$ and $S_{OUT2}$ signals with the $R_{IN}$ signal. In this embodiment, the control logic 56 controls the switching circuit 58 to output the $S_{OUT1}$ signal or signal $S_{OUT2}$ having the lowest correlation with the $R_{IN}$ signal.

The image filter 44 is intended to contain a stable and good copy of the converged echo path model used by the adaptive filter circuit 50. To minimize the risk of incorrectly updating the image filter 44 with a perturbed or non-converged echo path model (something that can happen due to packet-loss), the image filter 44 should be updated with the adaptive filter content only when the adaptive filter 42 remains stable and converged for a predetermined number of packets, e.g., five packets. In one exemplary embodiment, the update criterion is based on a comparison of the energy levels of the $S_{OUT1}$ and $S_{OUT2}$ signals. In this embodiment, the filter circuit 40 is configured to compare the energy levels of the $S_{OUT1}$ and $S_{OUT2}$ signals and to update the image filter 44 only when the energy level of the $S_{OUT1}$ signal is less than energy level of the $S_{OUT2}$ signal for five consecutive packets. The image filter 44 should not be updated if packet loss is detected.

Because the image filter 44 stores a previous version of the echo model prior to the packet loss, it is possible to reduce the residual echo in the packets of the $S_{OUT}$ signal following the loss-concealment packet. With the image filter 44, the output of the adaptive filter 42 is no longer used when the echo model diverges due to packet loss. Instead, the echo estimate provided by the image filter 44 is used to generate the $S_{OUT}$ signal until the echo model used by the adaptive filter 42 re-converges. The cost of the image filter 44 is the amount of FIR filtering needed to generate an echo estimate from the image filter 44, as well as memory for the storage of the image filter 44. The performance improvement is independent of the PLC technique used in the echo path.

Figure 9:
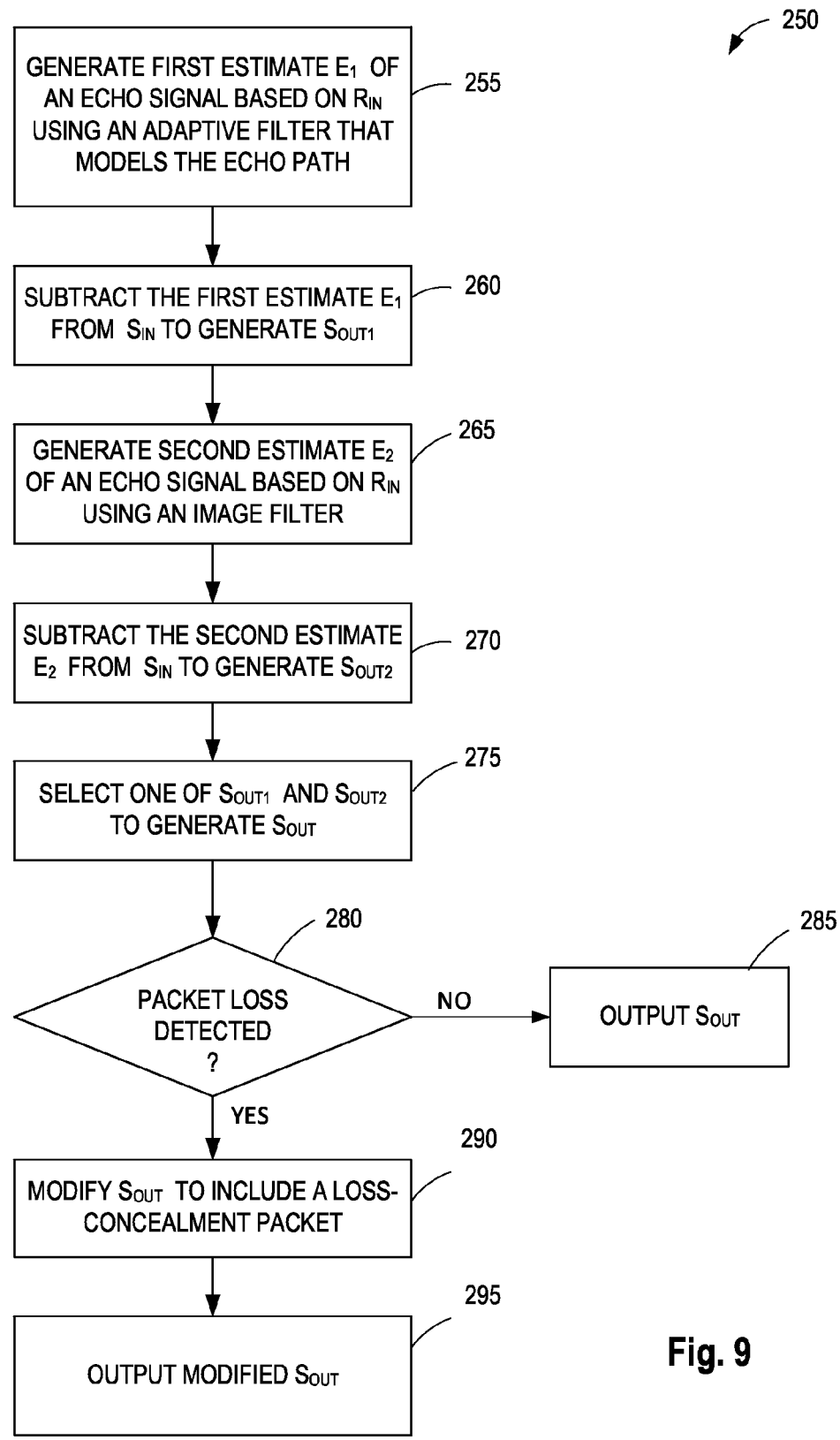
FIG. 9 illustrates a method implemented by the echo canceller depicted in FIG. 8.

FIG. 9 illustrates an exemplary method 250 implemented by the echo canceller 20 shown in FIG. 8. The adaptive filter 42 of the echo canceller 20 generates a first estimate $E_1$ of an echo signal based on the $R_{IN}$ signal using an adaptive filter 42 that models the echo path (block 255). The echo cancellation circuit 50 subtracts the first estimate $E_1$ of the echo signal from the $S_{IN}$ signal to generate the $S_{OUT1}$ signal (block 260). The image filter 44 generates a second estimate $E_2$ of the echo signal based on the $R_{IN}$ signal using an image filter 44 that stores a stable and converged copy of the adaptive filter 42 (block 265). The echo cancellation circuit 50 subtracts the second estimate $E_2$ of the echo signal from the $S_{IN}$ signal to generate the $S_{OUT2}$ signal (block 270). The echo cancellation circuit 50 then selects one of the $S_{OUT1}$ or $S_{OUT2}$ signals as the $S_{OUT}$ signal based on a predetermined selection criterion (block 275). In one exemplary embodiment, the echo cancellation circuit 50 selects one of the $S_{OUT1}$ and $S_{OUT2}$ signals with the lowest energy over one or more packets. In another embodiment, the selection circuit 60 selects one of the $S_{OUT1}$ and $S_{OUT2}$ signals having the lowest correlation with the $R_{IN}$ signal over one or more packets. The packet loss detection circuit 70 detects a packet loss in the echo path (block 280). If no packet loss is detected, the selection circuit 60 outputs the $S_{OUT}$ signal output by the echo cancellation circuit 50 (block 285). If packet loss is detected, the packet loss concealment circuit 80 of the echo canceller 20 modifies the $S_{OUT}$ signal to include a loss-concealment packet (block 290) and the selection circuit 60 outputs the modified $S_{OUT}$ signal (block 295). The loss-concealment packet replaces the packet in the $S_{OUT}$ signal affected by the packet loss.

Figure 10:
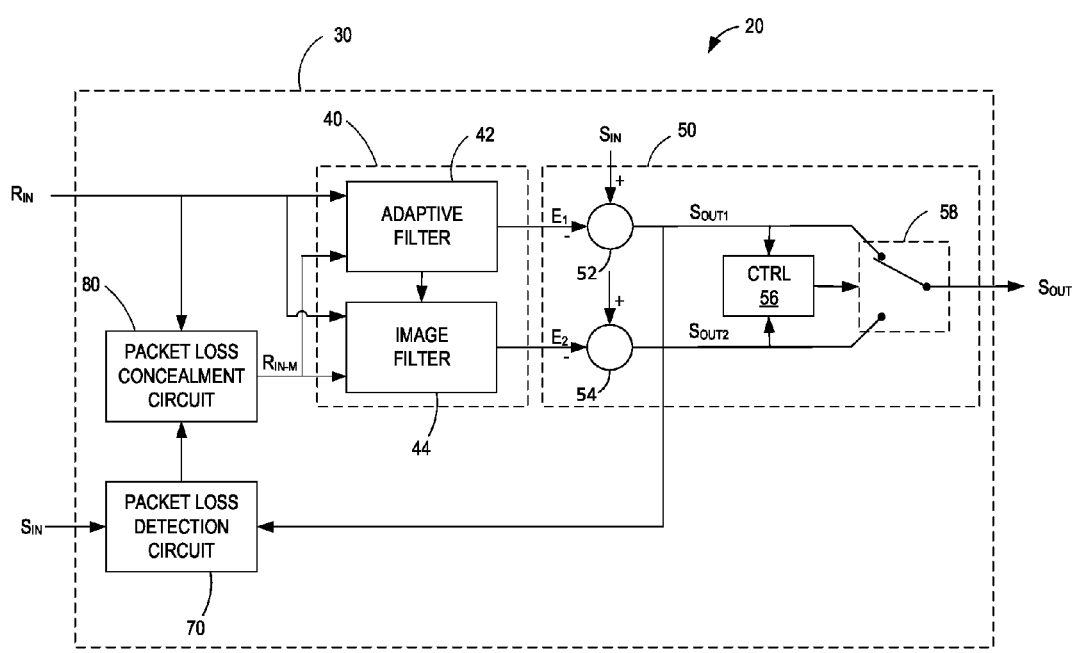
FIG. 10 illustrates the processing circuit of the echo canceller according to a fourth embodiment.

FIG. 10 illustrates the main functional elements of the processing circuit 30 in a fourth embodiment of the echo canceller 20. This embodiment of the echo canceller 20 combines packet loss concealment on the $R_{IN}$ signal to conceal the lost packet and an image filter 44 to reduce residual echo in the packets of the $S_{OUT}$ signal following the lost packet.

The processing circuit 30 shown in FIG. 10 comprises a filter circuit 40, an echo cancellation circuit 50, a packet loss detection circuit 70, and a packet loss concealment circuit 80. The $R_{IN}$ signal is input to the filter circuit 40. The filter circuit 40 comprises an adaptive filter 42 and an image filter 44 as previously described. The adaptive filter 42 models the echo path between the Ro port and the $S_I$ port of the echo canceller 20. The adaptive filter 42 filters the $R_{IN}$ signal using filter coefficients derived based on the echo path model to generate a first estimate $E_1$ of the echo signal. The image filter 44 stores a stable copy of the converged echo path model used by the adaptive filter 42 so that the image filter 44 may be used when the adaptive filter 42 diverges from the correct echo-path model. The image filter 44 filters the $R_{IN}$ signal using the stored copy of the adaptive filter 42 to generate a second estimate $E_2$ of the echo signal. The estimates $E_1$ and $E_2$ output by the adaptive filter 42 and image filter 44 respectively are applied to the echo cancellation circuit 50.

The echo cancellation circuit 50 comprises first and second adding circuits 52 and 54, respectively, control logic 56, and a switch 58. The first adding circuit 52 subtracts the first estimate $E_1$ of the echo signal from the $S_{IN}$ signal to generate a first sending output signal, $S_{OUT1}$. The second adding circuit 54 subtracts the second estimate $E_2$ of the echo signal from the $S_{IN}$ signal to generate a second sending output signal, $S_{OUT2}$. The packet loss detection circuit 70 detects packet loss in the echo path based on the $S_{OUT1}$ and $S_{IN}$ signals as previously described. When no packet loss is detected, the control logic 56 compares the $S_{OUT1}$ and $S_{OUT2}$ signals and selects one based on a predetermined criterion. Switching circuit 58, under the control of the control logic 56, outputs the selected one of the $S_{OUT1}$ and $S_{OUT2}$ signals as the $S_{OUT}$ signal. In one exemplary embodiment, the control logic 56 compares the energies of the $S_{OUT1}$ and $S_{OUT2}$ signals and selects the one with the lowest energy. In one exemplary embodiment, the control logic 56 correlates the energies of the $S_{OUT1}$ and $S_{OUT2}$ signals with the $S_{IN}$ signal and selects the one with the lowest correlation.

When a lost packet is detected in the IP-to-CS path, the packet loss detection circuit 70 enables the packet loss concealment circuit 80, which is normally disabled. The $R_{IN}$ signal is input to the packet loss concealment circuit 80. The packet loss concealment circuit 80 modifies the $R_{IN}$ signal as previously described. The modified $R_{IN}$ signal, $R_{IN-M}$, is input to the filter circuit 40. The adaptive filter 42 and image filter 44 regenerate the first and second estimates $E_1$ and $E_2$ respectively of the echo signal based on the modified $R_{IN}$ signal. The regenerated echo estimates $E_1$ and $E_2$ are then subtracted from the $S_{IN}$ signal by the echo cancellation signal 50 to obtain new $S_{OUT1}$ and $S_{OUT2}$ signals. The control logic 56 compares the new $S_{OUT1}$ and $S_{OUT2}$ signals and selects one based on a predetermined criterion. Switching circuit 58, under the control of the control logic 56, outputs the selected one of the new $S_{OUT1}$ and $S_{OUT2}$ signals as the $S_{OUT}$ signal.

Figure 11:
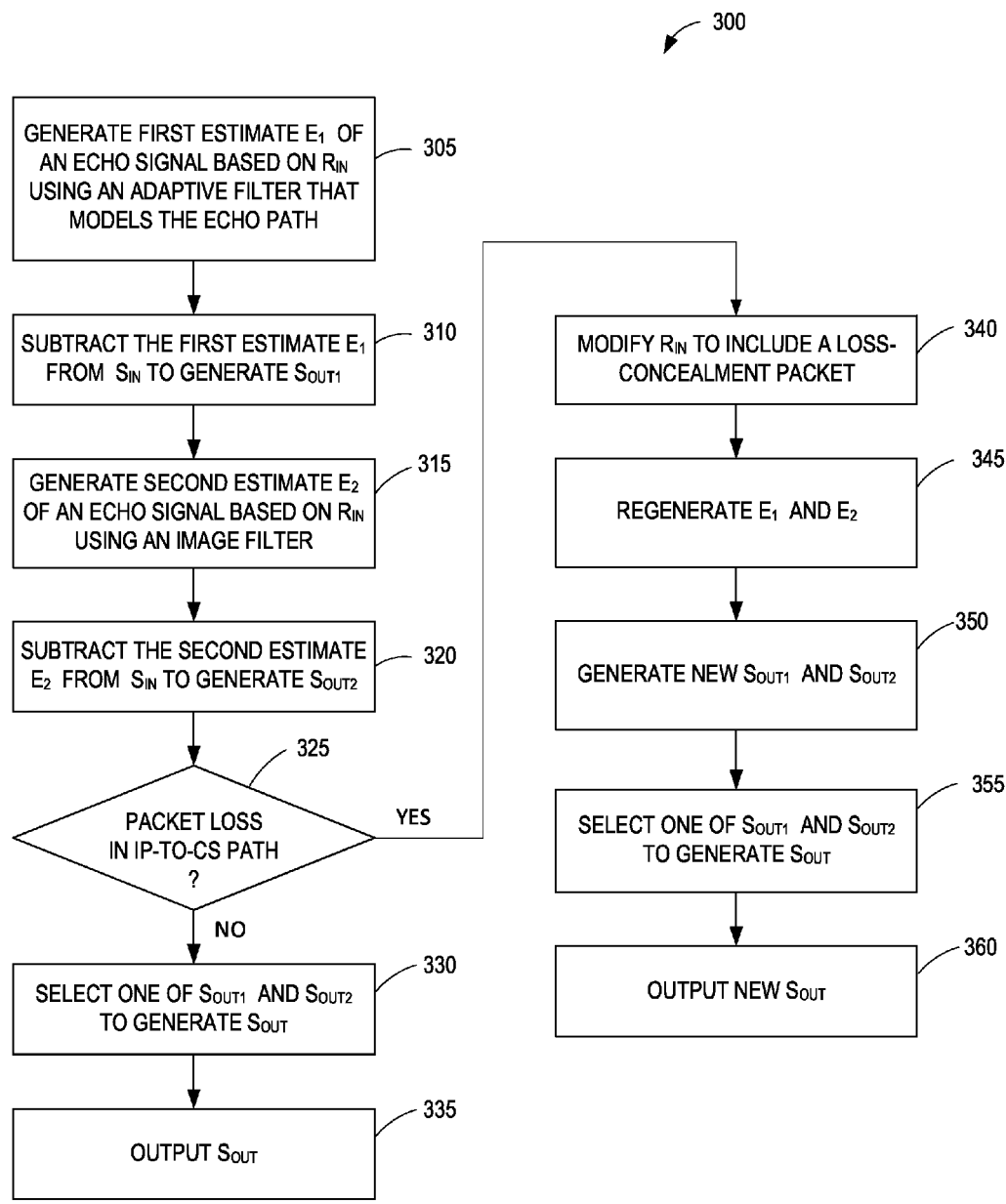
FIG. 11 illustrates a method implemented by the echo canceller depicted in FIG. 10.

FIG. 11 illustrates an exemplary method 300 implemented by the echo canceller 20 shown in FIG. 10. The adaptive filter 42 of the echo canceller generates a first estimate $E_1$ of an echo signal based on the $R_{IN}$ signal using an adaptive filter 42 that models the echo path (block 305). The echo cancellation circuit 50 subtracts the first estimate $E_1$ of the echo signal from the $S_{IN}$ signal to generate the $S_{OUT1}$ signal (block 310). The image filter 44 generates a second estimate $E_2$ of the echo signal based on the $R_{IN}$ signal using an image filter 44 that stores a stable and converged copy of the adaptive filter 42 (block 315). The echo cancellation circuit 50 subtracts the second estimate $E_2$ of the echo signal from the $S_{IN}$ signal to generate the $S_{OUT2}$ signal (block 320). The packet loss detection circuit 70 detects a packet loss in the echo path (block 325). If no packet loss is detected, the echo cancellation circuit 50 selects one of the $S_{OUT1}$ or $S_{OUT2}$ signals as the $S_{OUT}$ signal based on a predetermined selection criterion (block 330). The switching circuit 58, under the control of the control logic 56, outputs the selected one of the $S_{OUT1}$ and $S_{OUT2}$ signals as the $S_{OUT}$ signal (block 335). If packet loss is detected and the packet loss is in the IP-to-CS path, the packet loss concealment circuit 80 of the echo canceller 20 modifies the $R_{IN}$ signal to include a loss-concealment packet (block 340). The modified $R_{IN}$ signal, $R_{IN-M}$, is input to the filter circuit 40. The adaptive filter 42 and image filter 44 regenerate the first and second estimates $E_1$ and $E_2$ respectively of the echo signal based on the modified $R_{IN}$ signal (block 345). The regenerated estimates $E_1$ and $E_2$ of the echo signal are then subtracted from the $S_{IN}$ signal by the echo cancellation signal 50 to generate new $S_{OUT1}$ and $S_{OUT2}$ signals (block 350). In this case, the control logic 56 compares the new $S_{OUT1}$ and $S_{OUT2}$ signals and selects one based on a predetermined criterion (block 355). Switching circuit 58, under the control of the control logic 56, outputs the selected one of the new $S_{OUT1}$ and $S_{OUT2}$ signals as the $S_{OUT}$ signal (block 360).

The techniques herein described can be applied as enhancements to existing echo cancellers to reduce the development effort necessary to allow well-established echo cancellers to function with IP network impairments and to preserve fundamental performance and adaptation characteristics of existing/field-proven echo cancellers. Further, techniques herein offer a low complexity solution as compared to the complexity of a typical echo canceller. Thus, the increase in the overall echo canceller complexity to incorporate these techniques is small. The techniques described in this disclosure can also be applied to handle acoustic echo. That is, the techniques can be used to enhance the capability of existing acoustic echo control algorithms to allow their deployment in environments where IP impairments may occur.

The foregoing description and the accompanying drawings represent non-limiting examples of the methods and apparatus taught herein. As such, the present disclosure is not limited by the foregoing description and accompanying drawings. Instead, the present disclosure is limited only by the following claims and their legal equivalents.

What is claimed is:

1. A method of echo cancellation implemented by an echo canceller located in a packet-switched network, said method comprising:
    generating, from a receiving input signal received on a first input port of the echo canceller, a first estimate of an echo signal using an adaptive filter that models an echo path between a first output port and a second input port of the echo canceller;
    generating a sending output signal based on the first estimate of the echo signal and a sending input signal received on the second input port;
    detecting a packet loss in the echo path; and
    responsive to detection of the packet loss, modifying one of the receiving input signal and the sending output signal to include a loss-concealment packet.

2. The method of claim 1 wherein detecting the packet loss in the echo path comprises detecting the packet loss based on a comparison of the sending output signal and the sending input signal.

3. The method of claim 2 wherein detecting the packet loss based on a comparison of the sending output signal and the sending input signal comprises:
    computing energies of the sending output signal and the sending input signal; and
    detecting the packet loss when the difference between or ratio of the energy of the sending output signal and the energy of the sending input signal exceeds a predetermined amount.

4. The method of claim 1 wherein the sending input signal comprises a plurality of packets, each including a sequence number, and wherein detecting the packet loss in the echo path comprises detecting a direction of the packet loss in the echo path based on the sequence numbers in the plurality of packets.

5. The method of claim 1 wherein modifying one of the receiving input signal and sending output signal to include a loss-concealment packet comprises replacing a lost packet of the sending output signal with a loss-concealment packet.

6. The method of claim 1 wherein modifying one of the receiving input signal and sending output signal to include a loss-concealment packet comprises:
    modifying the receiving input signal to include a loss-concealment packet; and
    wherein the first estimate of the echo signal is regenerated using the modified receiving input signal.

7. The method of claim 6 wherein modifying the receiving input signal to include a loss-concealment packet is dependent on a direction of the packet loss and comprises:
    determining a target packet of the receiving input signal; and
    replacing the target packet with the loss-concealment packet.

8. The method of claim 7 wherein determining the target packet comprises:
    estimating an echo delay; and
    determining a location of the target packet based on the echo delay.

9. The method of claim 1 wherein generating a sending output signal based on the first estimate of the echo signal and the sending input signal comprises:
    subtracting the first estimate of the echo signal from the sending input signal to generate a first sending output signal;
    generating, from the receiving input signal, a second estimate of the echo signal using an image filter that stores a previous version of the echo path model used by the adaptive filter;
    subtracting the second estimate of the echo signal from the sending input signal received on said second input port to generate a second sending output signal; and
    selecting, based on a predetermined selection criterion, one of the first and second sending output signals as a final sending output signal of the echo canceller.

10. The method of claim 9 wherein selecting one of the first and second sending output signals as the final sending output signal comprises:
    computing energies of the first and second sending output signals; and
    selecting one of the first and second sending output signals with the lowest energy.

11. The method of claim 9 wherein selecting one of the first and second sending output signals as the final sending output signal comprises:
    computing correlations of the first and second sending output signals with the receiving input signal; and
    selecting one of the first and second sending output signals with the lowest correlation.

12. The method of claim 9 further comprising updating the image filter when an energy of the first sending output signal is less than an energy of the second sending output signal for a predetermined number of consecutive packets.

13. A echo canceller comprising:
    a filter circuit configured to generate, from a receiving input signal received on a first input port of the echo canceller, a first estimate of an echo signal using an adaptive filter that models an echo path between a first output port and a second input port of the echo canceller;

a echo cancellation circuit configured to generate a sending output signal based on the first estimate of the echo signal and a sending input signal received on the second input port;

a detection circuit to detect a packet loss in the echo path;

a packet loss concealment circuit configured to modify, responsive to detection of the packet loss, one of the receiving input signal and the sending output signal to include a loss-concealment packet.

14. The echo canceller of claim 13 wherein the packet loss detection circuit is configured to detect the packet loss in the echo path based on a comparison of the sending output signal and the sending input signal.

15. The echo canceller of claim 13 wherein the packet loss detection circuit is configured to detect the packet loss in the echo path by:

computing energies of the sending output signal and sending input signal; and detecting the packet loss when the difference between or ratio of the energy of the first sending output signal and the energy of the sending input signal exceeds a predetermined amount.

16. The echo canceller of claim 13 wherein the sending input signal comprises a plurality of packets, each including a sequence number, and wherein the packet loss detection circuit is further configured to determine a direction of the packet loss in the echo path based on the sequence numbers in received packets.

17. The echo canceller of claim 13 wherein the packet loss concealment circuit is configured to modify the sending output signal by replacing a lost packet of the sending output signal with a loss-concealment packet.

18. The echo canceller of claim 14 wherein the packet loss concealment circuit is configured to modify the receiving input signal to include a loss-concealment packet; and wherein the first estimate of the echo signal is regenerated using the modified receiving input signal.

19. The echo canceller of claim 18 wherein the packet loss concealment circuit is configured to modify the receiving input signal to include a by:

determining a target packet of the receiving input signal;

replacing the target packet with the loss-concealment packet; and wherein modifying the receiving input signal is dependent on a direction of the packet loss.

20. The echo canceller of claim 19 wherein, to determine a target packet of the receiving input signal, the packet loss concealment circuit is further configured to:

estimate an echo delay; and determine a location of the target packet based on the echo delay.

21. The echo canceller of claim 13 wherein:

the filter circuit is configured to generate from the receiving input signal, a second estimate of the echo signal using an image filter that stores a previous version of the echo path model used by the adaptive filter;

the echo cancellation circuit is configured to subtract the first and second estimates of the echo signal from the sending input signal received on said second input port to generate a first and second sending output signals, and to select based on a predetermined selection criterion one of the first and second sending output signals as a final sending output signal of the echo canceller.

22. The echo canceller of claim 21 wherein the echo cancellation circuit is configured to select one of the first and second sending output signals by:

computing energies of the first and second sending output signals; and selecting one of the first and second sending output signals with the lowest energy.

23. The echo canceller of claim 21 wherein the echo cancellation circuit is configured to select one of the first and second sending output signals by:

computing correlations of the first and second sending output signals with the receiving input signal; and selecting one of the first and second sending output signals with the highest correlation.

24. The echo canceller of claim 21 wherein the filter circuit is configured to update the image filter when an energy to the first sending output signal is less than an energy of the second sending output signal for a predetermined number of consecutive packets.

25. A non-transitory computer readable medium containing executable program code, that when executed by a processing circuit, causes the processing circuit to:

generate, from a receiving input signal received on a first input port of an echo canceller, a first estimate of an echo signal using an adaptive filter that models an echo path between a first output port and a second input port of the echo canceller;

generate a sending output signal based on the first estimate of the echo signal and a sending input signal received on the second input port;

detect a packet loss in the echo path; and responsive to detection of the packet loss, modify one of the receiving input signal and the sending output signal to include a loss-concealment packet.

\* \* \* \* \*

UNITED STATES PATENT AND TRADEMARK OFFICE
CERTIFICATE OF CORRECTION

PATENT NO. : 9,270,830 B2  
APPLICATION NO. : 13/960008  
DATED : February 23, 2016  
INVENTOR(S) : Rabipour et al.

Page 1 of 2

It is certified that error appears in the above-identified patent and that said Letters Patent is hereby corrected as shown below:

On the Title Page

In Item (75), under "Inventors", in Column 1, Line 1, Delete "Quebec (CA);" and insert -- Québec (CA); --, therefor.

In the Specification

In Column 2, Lines 62-63, delete "canceller" and insert -- canceller. --, therefor.

In Column 3, Line 33, delete "$R_o$ port." and insert -- $R_O$ port. --, therefor.

In Column 4, Line 39, delete "port ($S_1$)" and insert -- port ($S_I$) --, therefor.

In Column 4, Line 59, delete "Ro port" and insert -- $R_O$ port --, therefor.

In Column 6, Line 9, delete "E1" and insert -- $E_1$ --, therefor.

In Column 6, Line 18, delete "Ro port" and insert -- $R_O$ port --, therefor.

In Column 6, Line 29, delete "$R_{IN-M}$)" and insert -- $R_{IN-M}$, --, therefor.

In Column 10, Line 1, delete "Ro port" and insert -- $R_O$ port --, therefor.

In the Claims

In Column 12, Line 64, in Claim 13, delete "A echo" and insert -- An echo --, therefor.

Signed and Sealed this  
Seventh Day of March, 2017

Michelle K. Lee  
*Director of the United States Patent and Trademark Office*

CERTIFICATE OF CORRECTION (continued)
U.S. Pat. No. 9,270,830 B2

In Column 13, Line 3, in Claim 13, delete "a echo" and insert -- an echo --, therefor.

In Column 13, Line 42, in Claim 19, delete "include a by:" and insert -- include by: --, therefor.